United States Patent Office 3,003,988
Patented Oct. 10, 1961

3,003,988
STABILIZER FOR DENTURES
Donald P. Germann, Binghamton, N.Y., Edward L. Kropa, Greensboro, N.C., and Robert W. King and Palmer B. Stickney, Columbus, Ohio; said Kropa, said King and said Stickney, assignors, by mesne assignments, to Clark-Cleveland Incorporated, Binghamton, N.Y., a corporation of New York
No Drawing. Filed Oct. 16, 1958, Ser. No. 767,512
4 Claims. (Cl. 260—33.6)

This invention relates to synthetic water-sensitized, but water-insoluble, materials for stabilizing dentures, or the like, denture-stabilizing compositions containing the synthetic materials, and processes for preparation of these materials. More particularly, these are synthetic, hydrophilic, colloidal materials comprising mixed, partial salts of lower alkyl vinyl ether-maleic anhydride-type copolymers.

Ordinary removable dentures, dental plates, and the like, comprise teeth mounted in a suitable plate or base. Dentures function as a substitute for missing teeth and serve as a replacement for all or a portion of the teeth ordinarily found in the oral cavity. Although dentures generally are skillfully prepared, often they do not fit perfectly. Moreover, no matter how satisfactory at first, after a period of time, the fit of the denture becomes loose and imperfect, due to natural shrinkage and changes in the gums, mucous tissues, and the like. Loose and imperfectly fitted dentures usually are corrected and stabilized by the use of a denture stabilizer. Denture stabilizers are used to fill the interstices between the denture and the gums or tissues. Prior to placement of the denture in the oral cavity, a denture stabilizer is applied to the denture-plate surface which, for a perfect fit, should uniformly contact the gums of mucous tissues. The denture stabilizer serves as a cushion or gasket between the denture and the gums or tissues, and positions the denture securely in the oral cavity. Denture-stabilizer compositions, in the form of powders comprising a finely ground natural gum, are commercially available. These powders usually are applied by sprinkling a thin coating of the powder on the appropriate surface of the denture. Cream-type compositions comprising finely ground particles of the natural gum dispersed in a cream base, also are available and may be used instead of powder compositions. Individual particles of the natural gum in the denture stabilizer, when wet with water or saliva, swell to many times their normal dry size, coalesce and form a viscous gel. The viscous gel serves as the insulator, cushion, or gasket between the denture and the gums and tissues, and means for securely positioning the denture in the oral cavity.

For many years, karaya gum, in the form of finely divided particles, has been the principal stabilizing component or material in commercially available denture-stabilizer compositions. Karaya gum is a natural exudate from the tree *Sterculia urens*, growing in Central India. As such, it is subject to wide variations in properties, such as viscosity, color and content of bark and other foreign matter. Additionally, wide variations in chemical and physical properties are found in samples exuded at different times of the year. Considerable variations in the price of the gum can also occur, and supply problems, particularly in time of war, may be encountered for this imported raw material. Generally, karaya gum stabilizing compositions have stabilizing characteristics for only a limited time, so that more than one application per day is usually necessary.

Commercial denture-stabilizer compositions, along with the karaya gum as a stabilizing material, generally contain additional materials for purposes well recognized in the art. Additional materials frequently included are: flavors; colors; pH stabilizers; bactericidal or fungicidal agents; special deodorants and perfumes; suspension and dispersing agents; plasticizers; inert fillers; etc., and vehicles, such as petrolatum, mineral oil, and the like, may be used in cream-type stabilizing compositions.

Requirements and characteristics for a satisfactory denture-stabilizing composition are many and are dictated by numerous factors. Desirably, one daily application of such a composition should function as an effective means for insulating, cushioning, and securely positioning the denture. The composition should retain its characteristics and properties in the powder and cream forms during storage under various climatic conditions, such as temperature and humidity; be readily and easily capable of application to the denture surface; not be irritating or uncomfortable to the user; be safe and nontoxic; have no disagreeable odor or color; have no unpalatable taste; provide antiseptic and germicidal properties for preventing or inhibiting the growth of organisms ordinarily found in the mouth; and function as a deodorant or agent for prevention of putrefaction or malodorous decomposition of foods of secretions lodging beneath or adjacent to the denture. The material must be capable of imbibing water and saliva and swelling, so as to fill the interstices between the denture and the gum of mucous tissues. The composition should not attack or damage the denture, as by causing a crazing of the denture-plate material. Additionally, the composition should be stable to moderate heat or cold, bacteria and molds, enzyme systems found in the oral cavity, and have a pH of between 5 and 8.5, preferably about 7. The mechanical strength of the gel or colloid formed by imbibition of water should be great enough to securely maintain the position of the denture under normal use, and not so great as to make denture removal difficult when desired, or as to damage or injure the gums, tissues, or denture upon removal.

An object of the invention is to provide synthetic denture-stabilizer materials and denture-stabilizing compositions containing the same that are superior to and improved in many respects over conventional denture-stabilizer materials from natural sources and compositions containing the same.

Another object is to provide a synthetic denture-stabilizer material aesthetically acceptable to the user by providing the denture stabilizer in the form of a fine, white powder, or cream containing the same, which, when wet with water or saliva, becomes a transparent gel.

A further object of the invention is to provide a satisfactory and effective denture-stabilizer material of a synthetic, hydrophilic, colloidal material, which may be synthesized from materials commercially available from domestic sources with accurate control of the properties and characteristics of the denture stabilizer from batch to batch, and processes for preparation of the same, to thus avoid and eliminate the need for grading, processing, and blending of various lots of natural raw materials, such as Karaya gum.

An additional object is to provide processes superior to prior art processes for preparation of the synthetic denture-stabilizer materials and compositions containing the same.

It is the further object of the invention to provide synthetic, water-sensitized, but water-insoluble polymers in the form of salts of acidic polymers derived at least in part from unsaturated acids, in a form suitable for denture-stabilization applications with properties and characteristics superior to conventional denture-stabilizer materials from natural sources.

A more specific object is to provide mixed, partial salts of copolymers of maleic anhydride with other vinyl monomers, and partial esters of such salts for use as denture-stabilizing materials. In particular, an object of the invention is to provide mixed, partial salts of copolymers of maleic anhydride with lower alkyl vinyl ethers and partial esters of such salts.

Other objects, features, and advantages of the instant invention will be readily apparent from the following detailed disclosure and illustrated embodiments of the invention.

It has been discovered that certain synthetic materials, particularly certain mixed, partial salts of the lower alkyl vinyl ether-maleic anhydride-type copolymers of particular particle size, pH, and apparent density provide new denture-stabilizer materials. The mixed, partial salts have a pH within the range of 5 to 8.5, with those having a pH between 6 and 7 preferred. The mixed, partial salts are frangible so that appropriate particle size and bulk density can be obtained. For best results the particles should be capable of passage through a 150-mesh sieve (U.S.B.S. series) and preferably are less than 0.74 millimeter in their largest dimension. The synthetic stabilizers of the invention consist of mixed, partial salts (containing calcium cations and alkali cations selected from the group consisting of sodium, potassium, and quaternary ammonium cations in particular proportions and amounts) of specific copolymers and of lower alkyl (i.e., derived from alcohols containing less than 5 carbon atoms) partial esters, preferably the partial isopropyl ester, of these copolymers. The equivalent ratio of calcium cations to the alkali cations in the mixed salts may range from 2:1 to 10:1 and preferably is between 3:1 and 7:1 (on a mole ratio basis, the range of calcium to alkali cations is from 1:1 to 5:1 and preferably is between 1.5:1 and 3.5:1). The sum total of cations in the partial, mixed salt should be sufficient to give a neutralization of from 0.5 to 0.95 and preferably 0.7 to 0.9 of the total initial carboxyl groups in the copolymer. In determination of the total initial carboxyl groups in the copolymer, the anhydride radical

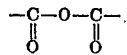

is considered as containing two initial carboxyl groups. The synthetic stabilizers include mixed salts of the specific copolymers that have less than about one-third of the total initial carboxyl groups esterified. Preferably, the total initial carboxyl groups neutralized by salt formation, or by salt formation and esterification, do not exceed 95 percent of the total of the initial carboxyl groups of the specific copolymer. The mixed salts of copolymers containing about 5 to 15 percent of the total initial carboxyl groups as unreacted acid groups, rather than salts or esters thereof, provide particularly superior stabilizing properties.

Suitable polymers for preparing the partial, mixed salts of the invention always contain a substantial number of groups from the class consisting of carboxyl

and anhydride

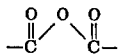

groups. In particular the lower alkyl vinyl ether-maleic anhydride copolymers are defined as polymeric materials consisting essentially of the repeated structural unit,

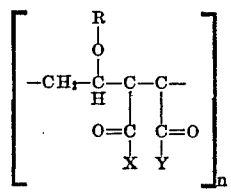

wherein X and Y separately each represent a hydroxyl radical (—OH) and X and Y together represent oxygen (=O), R represents an alkyl radical containing less than five carbon atoms, and $n$ is an integer representing the number of repeated occurrences of the structural unit in the molecule. It is essential that the integer "$n$" be large enough to provide a specific viscosity exceeding 1.2 (specific viscosity is equal to one less than the ratio of the viscosity by weight of the copolymer in methyl ethyl ketone (MEK) at 25° C. to the viscosity of pure MEK at 25° C.). Otherwise, mixed salts having the requisite denture-stabilizing properties and characteristics will not be obtained. Copolymers having a viscosity higher than 2.0 are preferred, because these polymers provide mixed salts with the best color and optimum denture-stabilizing properties. Inferior stabilizing properties and a yellowing color generally are found in salts of copolymers having significantly lower viscosities than the preferred.

The suitable copolymers may be obtained by copolymerizing a lower alkyl vinyl ether monomer, such as methyl vinyl ether, ethyl vinyl ether, divinyl ether, propyl vinyl ether, and isobutyl vinyl ether, with maleic anhydride. Suitable copolymers are commercially available. The copolymers are not limited only to those from copolymerization of only one vinyl ether monomer with maleic anhydride, but include those from copolymerization of mixtures of more than one of the suitable vinyl ether monomers with maleic anhydride. In addition, copolymers containing half-esters of maleic anhydride can be used. Polymerization may be conducted by the well-known methods of the prior art, by selecting appropriate amounts and proportions of the monomers and appropriate conditions for polymerization, such as solvent, diluents, temperatures, and catalysts. Generally speaking, the suitable copolymers may be prepared by such well-known methods of the prior art (U.S. Patents No.: 2,782,182, No. 2,047,398, etc.) as, for example, solvent, solvent-nonsolvent, and mass polymerization processes, with the benzene-nonsolvent process particularly useful. The mole ratio of the total of ether monomers to the total of maleic monomers preferably is substantial unity, for example, polymerization of one mole of methyl vinyl ether with one mole of maleic anhydride.

The reactive carboxyl and anhydride groups of the suitable copolymers undergo the usual reactions (i.e., esterification, salt formation, hydrolysis, etc.) characteristic of these groups in other organic compounds. Due to the high molecular weight of the copolymers, the rates of such reactions generally are somewhat less than rates of corresponding reactions of lower molecular weight organic anhydrides and acids.

The salts of the invention can be prepared by dissolving the acidic polymers in water and neutralizing them with the appropriate bases. However, it has been discovered that the desired salts in a form suitable for use as denture stabilizers advantageously may be prepared by reacting the copolymers and the bases in a slurry in a mixture of a lower aliphatic alcohol and water. Advantageously the improved processes utilize smaller amounts of liquid medium than prior art processes and permit separation of the salts by relatively simple procedures. These facts permit savings. Additionally the improved processes avoid the use of excessive amounts of cation materials and consistently produce the mixed salts with the requisite physical characteristics and properties.

In this improved process of manufacture, a slurry is prepared of a suitable lower alkyl vinyl ether-maleic anhydride copolymer in a lower aliphatic alcohol (i.e. containing less than 5 carbon atoms). Calcium cations, preferably in the forms of calcium hydroxide ($Ca(OH)_2$), in the amount desired in the product are added to this slurry with the addition carried out at room temperature. An aqueous solution, containing the amount of the particular alkali cation, (preferably by solution of the particular hydroxide (e.g., NaOH) in water), that is desired in the product, is then added with stirring. Calcium and alkali cations are utilized in substantially the same equivalent ratio and amounts, as desired in the product (i.e., equivalent ratio Ca/Na from 2:1 to 10:1). The over-all alcohol-water ratio, after addition of the aqueous alkali cation solution, should be between 60:40 to 80:20 with a 70:30 ratio by volume preferred. The resulting slurry is heated with stirring until the pH levels off. The resulting mass is then filtered, dried and ground. The resulting product consists essentially of the particular mixed calcium-alkali partial salt of the partial ester of the copolymer and provides the satisfactory denture-stabilizing properties and characteristics of the invention.

In a preferred embodiment of the process, the alcohol is isopropyl alcohol and the ratio of alcohol to water is between 60:40 and 80:20 by volume with the preferred ratio about 70:30. A higher water content causes coagulation of the slurry, while a substantially lower water content provides a product having an apparent bulk density below about 0.5 gram/per cubic centimeter. Denture-stabilizing characteristics of the mixed salts of the invention are dependent on their apparent bulk densities, with the lower apparent bulk densities providing inferior stabilization characteristics. Bulk densities higher than 0.7 gram/per cubic centimeter are preferred. A significant decrease in stabilization characteristics is obtained with apparent bulk densities less than 0.5 gram/per cubic centimeter. Slurry temperatures should not exceed about 60° C. The preferred and optimum slurry temperature is less than 50°, and is generally from 40° to 50° C. While lower slurry temperatures are operable, an increase in reaction time is required.

Cations utilized in the processes for preparation of the partial, mixed salts of the invention may be provided by a number of various materials. Generally, the cations are obtained from compounds which contain the particular cations and are at least soluble in part in water, and, more particularly, from the more common salts or hydroxides containing the particular cations. Salts and alkalis, which are particularly suitable, are those that are completely soluble or soluble to a significant degree in water, or water-alcohol mixtures. Suitable compounds include calcium hydroxide, calcium acetate, calcium halides, calcium lactate, calcium gluconate, sodium hydroxide, sodium acetate, sodium carbonate, sodium halides, sodium potassium carbonate, sodium sulfate, potassium hydroxide, potassium halides, quaternary ammonium hydroxides, etc. The compounds used should be substantially pure to assure obtaining pure, white or colorless, partial, mixed salts. Salts, having anions that form toxic or irritating by-products, should be avoided, or special precautions and treatment provided to assure the removal and absence of such by-products from the partial, mixed salt product. Some by-products in various amounts may be tolerated without a detrimental effect on the stabilizing properties and characteristics of the mixed, partial salt. For example, a small amount of calcium acetate facilitates the solvation of calcium hydroxide. Partial, mixed salt products, containing about 2 percent or less by weight of the acetyl-radical-containing by-products which form during product preparation using calcium acetate, have no apparent detriment to stabilizing properties and characteristics.

In the illustrative examples that follow, all parts are given as parts by weight unless expressly stated otherwise.

Example I

A reaction kettle was charged with 825 parts of anhydrous isopropyl alcohol. 234 parts of a methyl vinyl ether-maleic anhydride copolymer (PVM/MA), having a specific viscosity of between 2.5 and 3.5, and 66.6 parts of calcium hydroxide were added to the isopropyl alcohol slowly, with good agitation, to form a slurry. A solution of 12.0 parts of sodium hydroxide dissolved in 450 parts of water was added slowly to this slurry, with good agitation. The resulting slurry has an isopropyl alcohol-to-water ratio of about 70:30 percent by volume. The resulting slurry was heated to a temperature of about 45° C. and held at this temperature until the pH of the slurry leveled off at about 6.6 (approximately 1½ hours). The slurry was then cooled to room temperature and filtered. The filter cake was dried in an air-circulating oven at 65° C. and then ground and screened through a 200-mesh sieve (U.S.B.S. sieve series).

More than 90 percent of the theoretical yield of a white powder was obtained consisting essentially of the calcium-sodium partial salt of an isopropyl partial ester of the methyl vinyl ether-maleic anhydride copolymer with a calcium-to-sodium equivalent ratio of 0.6:0.1 per initial carboxyl group in the copolymer and with the balance of the initial carboxyl groups present as unreacted acid and isopropyl ester groups. The product had an apparent bulk density of 0.80 gram per cubic centimeter and, at a concentration of 1 percent by weight in water, had a pH of 6.7.

The product, when applied to dentures and subjected to normal usage, gave stabilizing characteristics for 25 to 100 percent longer than were obtained under the same conditions with a commercial Karaya-gum-based denture stabilizer. With most subjects, a single application provided satisfactory stabilization for an entire day.

Examples II to V

Additional examples of calcium-sodium partial salts of a partial isopropyl ester of methyl vinyl ether-maleic anhydride copolymer (PVM/MA) were prepared in accordance with the general procedure of Example I. The specific viscosities of the PVM/MA copolymers utilized ranged between 2.5 and 3.5. In these examples the amounts of PVM/MA copolymers, calcium hydroxide, sodium hydroxide, and isopropyl alcohol, were varied to utilize and to obtain the tabulated alcohol-to-water ratios, the sodium-to-calcium ratios, the percent neutralization of the total of the initial carboxyl groups, and the remainder of the results found in the following table. In all cases the products had denture-stabilizing characteristics superior to commercial denture stabilizers.

| Example No. | Ratio (by Volume) $C_3H_7OH/H_2O$) | Equivalent Ratio, Ca/Na | pH Slurry | Percent Total Neutralization | Mixed, Partial Salt Powder | |
|---|---|---|---|---|---|---|
| | | | | | gms./cc. B.D.[1] | pH [2] |
| II | 70/30 | 3 | 5.5 | 50 | .57 | 5.8 |
| III | 75/25 | 9 | 6.1 | 50 | .58 | 5.8 |
| IV | 65/35 | 3 | 6.7 | 70 | .80 | 7.0 |
| V | 70/30 | 6 | 7.4 | 90 | .82 | 7.0 |

[1] Apparent bulk density, grams/cc.
[2] pH of 1 percent by weight of mixed, partial salt powder in water.

Example VI

A reaction vessel was charged with 380 parts of water and heated to 70° C. With the temperature of the water at about 70° C., 20 parts of a methyl vinyl ether-maleic anhydride copolymer (PVM/MA), having a specific viscosity of between 2.5 to 3.5, were added to the heated water, with agitation. Heating was continued, until the temperature of the solution reached 90° C., and stirring continued until a clear solution was obtained (less than 15 minutes). A solution containing 17.2 parts of calcium acetate dissolved in 100 parts of water was prepared. A solution containing 10 parts of sodium hydroxide dissolved in 100 parts of water also was prepared. The aqueous calcium acetate solution and the aqueous sodium hydroxide solution were added with agitation to the prepared clear solution containing the PVM/MA copolymer with the same at about room temperature. The mixed calcium-sodium salt of the PVM/MA copolymer was precipitated in two volumes of methyl alcohol. The precipitate was separated by filtration, washed in one volume of methyl alcohol, refiltered, and the filter cake dried in a vacuum oven at 85° C. The dried product was ground and screened through a 200-mesh sieve (U.S.B.S. sieve series).

Yield was 22.1 parts (97 percent of the theoretical yield) of a white powder consisting essentially of the calcium-sodium partial salt of the methyl vinyl ether-maleic anhydride copolymer with about 30 percent of the total initial carboxyl groups of the copolymer unreacted, a calcium-to-sodium equivalent ratio of 0.51:0.19 per initial carboxyl group, an apparent bulk density of 0.88 gram per cubic centimeter, and a pH of 7.5 for the powder at a concentration of 1 percent by weight in water. The powder product contained about 2 percent by weight of an acetyl-radical-containing by-product.

The product when applied to wet dentures had stabilizing characteristics superior to those of commercial denture stabilizers.

*Example VII*

A reaction vessel was charged with 950 parts of water and heated to 70° C. With the temperature of the water at about 70° C., 50 parts of a methyl vinyl ether-maleic anhydride copolymer (PVM/MA) having a specific viscosity between 1.2 to 1.8, were added to the heated water with agitation. Heating was continued, until the temperature of the solution reached 90° C., and stirring continued until a clear solution was obtained (less than 15 minutes). A solution containing 42 parts of calcium acetate dissolved in 250 parts of water was prepared. A solution containing 61.5 parts of sodium acetate dissolved in 250 parts of water also was prepared. The aqueous calcium acetate and sodium acetate solutions were added with agitation to the prepared clear solution of the PVM/MA copolymer with the same at room temperature. The partial calcium-sodium salt of the PVM/MA copolymer was precipitated in two volumes of methyl alcohol. The precipitate was separated by filtration, washed in one volume of methyl alcohol, refiltered, and the filter cake air dried at 60° C. for 24 hours and then dried in a vacuum oven at 85° C. The dried product was ground and screened through a 200-mesh sieve (U.S.B.S. sieve series).

Yield was 60 parts (over 90 percent of the theoretical yield) of a white powder consisting essentially of the calcium-sodium partial salt of the methyl vinyl ether-maleic anhydride copolymer with about 35 percent of the total of the initial carboxyl groups of the PVM/MA copolymer unreacted, a calcium-to-sodium equivalent ratio of 0.5:0.134 per equivalent carboxyl groups (by chemical analysis), an apparent bulk density of 0.92 gram per cubic centimeter, and a pH of 6.2 for the powder at a concentration of 1 percent by weight in water. The product contained about 2 percent of an acetyl-radical-containing by-product.

The product when applied to the surface of wet dentures gave stabilizing characteristics superior to those of commercial denture stabilizers.

*Example VIII*

A reaction vessel was charged with 950 parts of water and heated to 70° C. With the temperature of the water at about 70° C., 50 parts of a methyl vinyl ether-maleic anhydride copolymer (PVM/MA), having a specific viscosity of between 1.2 to 1.8, were added to the heated water with agitation. Heating was continued, until the temperature of the solution reached 90° C., and stirring continued until a clear solution was obtained (less than 15 minutes). A slurry containing 12 parts of calcium hydroxide in 250 parts of water was prepared. The calcium hydroxide slurry was added to the clear PVM/MA solution with stirring. A white precipitate which formed, dissolved slowly upon continued stirring for about 3 hours to give a clear solution. A solution containing 3.5 parts of sodium hydroxide dissolved in 150 parts of water was prepared. The sodium hydroxide solution was then added to this clear solution with stirring. After stirring for about an additional hour, water was evaporated by air drying at 60° C. for 24 hours and by further drying in a vacuum oven at 85° C. for 3 hours. The dried product was ground and screened through a 200-mesh sieve (U.S.B.S. sieve series).

More than 95 percent of the theoretical yield of a white powder was obtained consisting essentially of the calcium-sodium partial salt of the methyl vinyl ether-maleic anhydride copolymer with 36 percent of the total initial carboxyl groups of the copolymer unreacted, a calcium-to-sodium ratio of 0.5:0.14, an apparent bulk density of 0.87 gram per cubic centimeter, and a pH of 6.1 for the powder at a concentration of 1 percent by weight in water.

When used as a denture stabilizer, the product was superior to commercial denture stabilizers.

*Example IX*

An ethyl vinyl ether-maleic anhydride copolymer (PVE/MA), having a specific viscosity of about 2.2, was prepared according to a gel polymerization technique in which substantially equimolar amounts of the monomers, ethyl vinyl ether and maleic anhydride, were copolymerized with benzene as the solvent and lauroyl peroxide as the polymerization catalyst.

A reaction kettle was charged with 92 parts of anhydrous isopropyl alcohol, 25.0 parts of the ethyl vinyl ether-maleic anhydride copolymer (PVE/MA), having a specific viscosity of approximately 2.2, and 6.53 parts of calcium hydroxide were added to the isopropyl alcohol slowly, with good agitation, to form a slurry. A solution of 1.2 parts of sodium hydroxide dissolved in 40 parts of water was added slowly to this slurry, with good agitation. The resulting slurry had an isopropyl alcohol-to-water ratio of about 70:30 by volume. The resulting slurry was heated to a temperature of about 48° C. and held at this temperature until the pH of the slurry leveled off at about 6.6 (approximately 1½ hours). The slurry was then cooled to room temperature and filtered. The filter cake was dried in an air-circulating oven at 60° C. and then ground and screened through a 200-mesh sieve (U.S.B.S. sieve series).

Yield was essentially 100 percent of theoretical of a white powder consisting essentially of the calcium-sodium partial salt of an isopropyl partial ester of the ethyl vinyl ether-maleic anhydride copolymer with a calcium-to-sodium equivalent ratio of 0.6:0.1 per initial carboxyl groups in the copolymer with the balance of the initial carboxyl groups present as unreacted acid and isopropyl ester groups, an apparent bulk density of 0.6 gram per cubic centimeter and a pH of 6.5 for the powder at a concentration of 1 percent by weight of water. The product provided denture stabilization superior to that of commercial denture stabilizers.

While the partial, mixed salts of the invention may be utilized separately and as mixtures of several partial, mixed salts to provide denture-stabilizing properties and characteristics, it frequently is desirable for aesthetic, economic, or other purposes to utilize a composition containing one or more partial, mixed salts as the principal stabilizing component or material and additional materials for various additional purposes. In these compositions it is essential that the composition comprise more than 25 percent by weight of the partial, mixed salts of the invention. Smaller amounts of the partial, mixed salts fail to provide satisfactory denture stabilization or provide denture stabilization for periods less than those obtainable with conventional commercially available denture-stabilizing compositions containing karaya gum. Suitable materials for inclusion in these compositions are characterized as being nonreactive and compatible with the partial, mixed salts, and nontoxic and non-irritating in the amounts and frequency of use normally encountered. Suitable for inclusion are nonreactive, compatible, nontoxic, and nonirritating materials of the following classes: coloring agents, flavoring agents, pH stabilizers, antibacterial agents, antifungal agents, special deodorants and perfumes, suspension agents, dispersion agents, inert fillers, vehicles for cream-type compositions, such as petrolatum, mineral oil, and the like, and other hydrophylic gel-forming materials as extenders.

The denture-stabilizing compositions of the invention comprise more than 25 percent by weight of the partial mixed salts of the invention and preferably more than 40 percent by weight with the balance of the composition comprising the nonreactive, compatible nontoxic, nonirritating materials. These compositions, in general, may be prepared according to present-day methods well known in the art for preparation of denture-stabilizing compositions. Briefly, these methods comprise mixing or blending a mixture of the various components until a homogeneous composition is obtained.

Example X

A cream-type denture stabilizing composition was prepared by mixing together the following:

| | Parts |
|---|---|
| Calcium-sodium partial salt of isopropyl partial ester of PVM/MA copolymer, as prepared in Example I | 50 |
| Mineral oil, U.S.P. | 15 |
| Petrolatum, U.S.P. | 35 |
| Nontoxic antibacterial agent (8-hydroxquinoline) | 0.35 |
| Certified D and C color (scarlet, oil-soluble) | 0.002 |

A smooth homogeneous cream was obtained that could be packaged in flexible tubes and extruded on the surface of a denture. Satisfactory denture stabilization for periods in excess of that obtained with commercial powder or cream stabilizers were obtained from utilization of this cream.

Example XI

A denture-stabilizing powder composition was prepared by blending together the following:

| | Parts |
|---|---|
| Calcium-sodium partial salt of PVM/MA copolymer, as prepared in Example VI | 70 |
| Inert filler (calcium carbonate, C.P., powder) | 30 |
| Flavor (spearmint oil) | 0.01 |

When used as a denture stabilizer, this powder composition was superior to commercial denture-stabilizer powders.

Example XII

Additional cream-type and powder denture-stabilizing compositions were prepared by blending and mixing the components to homogeneous compositions. The principal stabilizing materials in these compositions were selected from the partial, mixed salts of the invention as prepared in Examples I, VI and IX with amounts of the partial mixed salt ranging from 25 to 99 parts per 100 parts of the composition. At least one or more component materials for each composition were used and were selected from materials and amounts thereof specified below:

| | Parts |
|---|---|
| Ultrafine precipitated calcium carbonate | 0 to 50 |
| Precipitated hydrated calcium silicate | 0 to 50 |
| Petrolatum, U.S.P. | 0 to 40 |
| Mineral oil, U.S.P. | 0 to 40 |
| Isopropyl palmitate | 0 to 5 |
| Isopropyl stearate | 0 to 5 |
| Hexylresorcinal, U.S.P. | 0 to 1 |
| Hexachlorophene, U.S.P. (2,2'-methylenebis (3,4, 6-trichlorophenol)) | 0 to 1 |
| 8-hydroxyquinoline, U.S.P. | 0 to 1 |
| Peppermint oil | 0 to 0.05 |
| Spearmint oil | 0 to 0.05 |
| Clove oil | 0 to 0.05 |
| Scarlet, certified food coloring | 0 to 0.05 |
| Orange, certified food coloring | 0 to 0.05 |

Compositions, containing more than 25 parts of the partial, mixed salts per 100 parts of the composition and the balance of component materials selected from the above listing provided denture stabilization for periods equivalent to, or longer than, that provided by a commercial denture-stabilizing composition with those containing more than 40 parts of the partial, mixed salts providing definitely superior denture stabilization.

For comparison purposes, compositions containing 15 and 1 parts, respectively, of the partial mixed salts per 100 parts of the composition and the balance of materials selected from the above listing were prepared and tested for denture-stabilizing properties. The composition containing only 15 parts of the partial, mixed salt gave a weak and transient stabilizing effect, while the composition containing only one part gave no apparent stabilization.

Denture-stabilization tests reported in the preceding examples were obtained from tests performed with a variety of dentures and a number of human subjects. Testing of some of the mixed, partial salts of the invention and compositions containing the same were carried out for periods as long as eight months, with at least one daily application of the material or composition being tested. During the testing, none of the test subjects was found to have any of the symptoms ordinarily found, or expected, in subjects under the effect of narcotics or toxic and poisonous materials. In addition, there was no evidence of sensitization.

While specific examples of materials, compositions, and processes have been described and illustrated, it will be apparent to those skilled in the art that a wide variety of changes and modifications may be made within the true spirit of the broadest aspects of the invention. It should be understood that the examples and the particular proportions and methods of procedure set forth are intended to be illustrative only and that the invention is to be limited only by the appended claims.

What is claimed is:

1. A denture-stabilizing composition having as a stabilizing component a material comprising more than 25 percent by weight of said denture-stabilizing composition and being a water-insoluble water-sensitized polymeric material; said material characterized by a particle size of minus 150-mesh U.S.B.S. sieve, by an apparent bulk density greater than 0.5 gram per cubic centimeter, and by a pH between 5 and 8.5, the pH being determined on a one percent by weight aqueous dispersion of said material in water; said material consisting essentially of a partial mixed salt of a copolymer selected from the group consisting of copolymers and partial lower alkyl esters of these copolymers, said copolymers consisting essentially of the repeated structural unit,

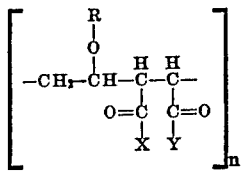

wherein X and Y separately each represent a hydroxyl radical and X and Y together represent a bivalent oxygen atom, R represents an alkyl radical of less than 5 carbon atoms, $n$ is an integer greater than one representing the number of repeated occurrences of said structural unit in a molecule of said copolymer and $n$ is large enough to characterize said copolymer as having a specific viscosity larger than 1.2, the specific viscosity being determined in methyl ethyl ketone at 25° C., said partial lower alkyl esters of said copolymers having less than one-third of the total initial carboxyl groups esterified, said partial mixed salts containing calcium cations and alkali cations, in a mole ratio between 1:1 and 5:1, the alkali cations selected from the group consisting of sodium, potassium, and quaternary ammonium cations, with not more than one third of the total initial carboxyl groups unreacted.

2. The composition of claim 1 containing therein more than 40 percent by weight of said water-insoluble water-sensitized polymeric material.

3. The composition of claim 1 in which said water-insoluble water-sensitized polymeric material is dispersed in mineral oil and petrolatum to provide a cream-type composition.

4. The composition of claim 1 containing therein said material of the particle size of minus 200-mesh U.S.B.S. sieve, of the apparent bulk density greater than 0.7 gram per cubic centimeter, and of a pH between 6 and 7.

References Cited in the file of this patent

UNITED STATES PATENTS

| | | |
|---|---|---|
| 2,047,398 | Voss et al. | July 14, 1936 |
| 2,586,398 | Niles | Feb. 19, 1952 |
| 2,652,380 | Hedrick et al. | Sept. 15, 1953 |
| 2,667,462 | Wildish et al. | June 26, 1954 |
| 2,698,264 | Niles | Dec. 28, 1954 |
| 2,726,230 | Carlson | Dec. 6, 1955 |

FOREIGN PATENTS

| | | |
|---|---|---|
| 420,589 | Great Britain | Dec. 3, 1934 |